United States Patent [19]
Witt

[11] 3,772,884
[45] Nov. 20, 1973

[54] LOAD EQUALIZING CONTROL FOR MULTIPLE UNIT POWER PLANTS

[75] Inventor: Ronald L. Witt, Rockford, Ill.

[73] Assignee: Woodward Governor Company, Rockford, Ill.

[22] Filed: July 27, 1972

[21] Appl. No.: 275,500

[52] U.S. Cl.............................................. 60/97 R
[51] Int. Cl......................................... F01b 25/00
[58] Field of Search................ 60/97 R, 97 S, 97 E, 60/97 H, 102

[56] References Cited
UNITED STATES PATENTS

| | | | |
|---|---|---|---|
| 2,490,113 | 12/1949 | Campbell | 60/97 R |
| 2,817,211 | 12/1957 | Reiners | 60/97 R |
| 3,048,743 | 8/1962 | Chillson | 60/97 S |
| 3,049,880 | 8/1962 | Bracey et al | 60/97 S |
| 3,174,284 | 3/1965 | McCarthy | 60/97 R |
| 3,174,287 | 3/1965 | Vortik | 60/97 R |
| 3,511,052 | 5/1970 | Gillespie | 60/97 |
| 3,526,091 | 9/1970 | Schuster | 60/102 |
| 3,618,470 | 11/1971 | Mueller et al. | 60/97 E X |
| 3,703,849 | 11/1972 | Renner et al. | 60/97 E |

*Primary Examiner*—Martin P. Schwadron
*Assistant Examiner*—Allen M. Ostrager
*Attorney*—C. Frederick Leydig et al.

[57] ABSTRACT

The fuel regulators of a plurality of prime movers driving a common load are positioned by individual combined speed and load regulating governors whose load settings are adjusted automatically in accordance with differences between pressure signals corresponding to the prevailing loading of the respective prime movers and a pressure signal corresponding to the average of the loads on all of the prime movers. To obtain the average load signal, the individual load signals are added and the sum is used to actuate a valve to produce a pressure which is exerted on a valve in opposition to the load signals and which corresponds to the average of the prime mover loads prevailing at any time.

10 Claims, 7 Drawing Figures

LOAD EQUALIZING CONTROL FOR MULTIPLE UNIT POWER PLANTS

BACKGROUND OF THE INVENTION

In multiple unit power plants, the supply of fuel or other energy medium to each unit is determined by a regulator whose position is varied by a speed governor having a selectively adjustable speed setter, the position of the regulator at any time being a measure of the prevailing load its iits prime mover. In prior systems in which the several prime movers are coupled to a common load, systems have been devised for equalizing the loads by selecting one of the units as a master reference and setting the regulators of the other or slave units automatically so that the loads on these units match that on the master unit. U.S. Pat. No. 3,511,052 discloses a system for effecting such load matching.

SUMMARY OF THE INVENTION

The primary objective of the present invention is to divide the total load in a multiple unit power plant of the above character equally between the units without the necessity of assigning one unit to act as a master reference. To achieve this objective, the present invention involves generally deriving from the movements of the energy supply regulators of the respective units signal forces corresponding in magnitude to the prevailing energy supplies and therefore the loads on the associated engines, adding these forces and deriving from the sum thereof a single opposing force which is the average of said first forces, separately balancing each of said first forces against said average force to thereby determine the deviation in the load on each prime mover from said average load, and adjusting the energy supply regulator of each prime mover in a direction and by an amount equal to the measured deviation of its load from said average load so as to equalize the loads on all of the prime movers.

For carrying out the foregoing method, the average load signal force and the load signal forces of the respective prime movers are derived from a pressure source and transmitted into a housing in which the load signals are exerted in one direction and the average load signal is exerted in the opposite direction on the stem of a valve to admit fluid from the pressure source to a closed pressure system or release fluid from such system to maintain in the system a pressure corresponding closely in magnitude to the average of the individual load signals. The pressure signal thus derived is transmitted to average load chambers in the valve housing and also to devices associated with the respective prime movers and operating to balance the load pressure signal thereof against the average load signal. The pressure differences thus derived by these devices are exerted on the respective governors of the prime movers so as to correct the energy supplies to the latter until the loads on the several prime movers are equalized.

The invention also resides in the novel construction of the average load measuring device including the frictionless mounting of the valve stem. A further object is to adapt the load averaging device for use selectively with different numbers of prime movers.

DESCRIPTION OF THE PREFERRED EMBODIMENT

Figure 1:
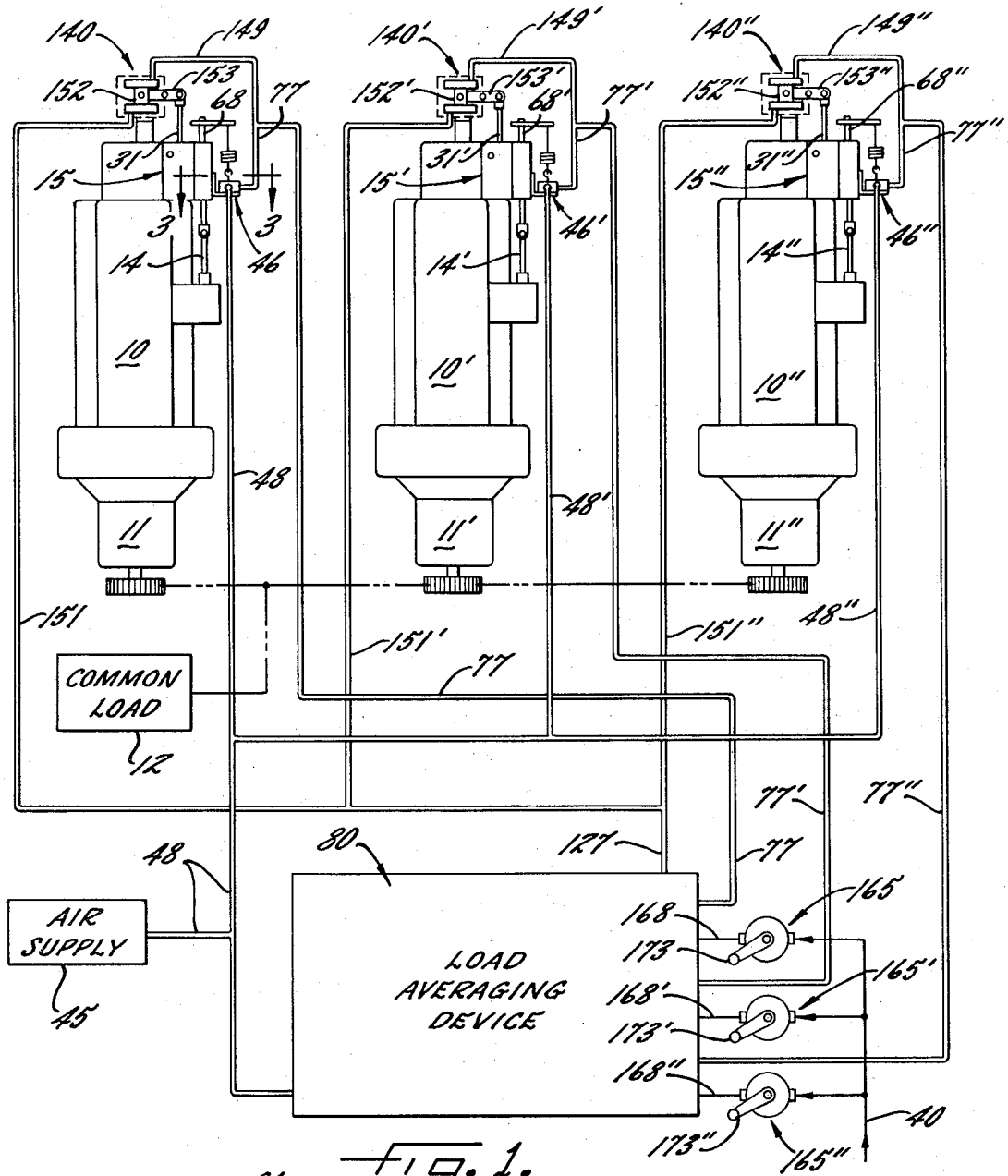
FIG. 1 is a schematic view and fluid circuit diagram of a control for automatically equalizing the loads on a plurality of prime movers of a multiple unit power plant in accordance with the present invention.

While the improved control may be employed with different types of prime movers, it is especially useful, as illustrated in the drawings, in equalizing the loads on a plurality of internal combustion engines 10, 10' and 10" adapted through clutches 11 to be coupled singly or in combination to a common load 12 which may, for example, be a marine propeller. Fuel supplies to the respective engines are determined by the positions of individual regulators such as fuel rods or throttles 14, 14' and 14" variably positioned by speed governors 15, 15' and 15" combined with load adjusters later to be described.

Herein, the actuator for the fuel rod 14 is of the hydraulic type and comprises a cylinder 19 formed in the casing 13 of the governor 15 and a piston 18 reciprocable in the cylinder and urged in the fuel-decreasing direction by a compression spring 20. Movement of the piston in the opposite direction is effected by the admission of oil to the cylinder from a passage 22 to which the flow of fluid is controlled by a valve 26 from a constant pressure supply created by a spring loaded by-pass valve 23 and a pump 24 driven by the engine output shaft 25.

Preferably the governor is of the droopless or isochronous type as disclosed in U.S. Pat. No. 2,478,753 and having a pilot valve 26 comprising a land 27 slidable in a ported sleeve 28 coupled to the shaft 25 and carrying the governor ball head 29. The land is on a rod 31 slidable in the sleeve and fixed to a head 32 urged downwardly by a compression spring 33 and upwardly by centrifugal force derived from flyweights 34 fulcrumed on the rotating ball head and bearing upwardly against the lower race of a bearing 35. The force of the spring and therefore the setting of the governor to maintain different engine speeds under prevailing loads is determined by the position of an abutment 36 formed by the end of a sleeve 37 axially slidable in the casing 13 and adjustable manually or by a remotely controllable power actuator 38 such as a step motor to increase or decrease the spring compression and therefore the speed setting of the governor.

Figure 6:
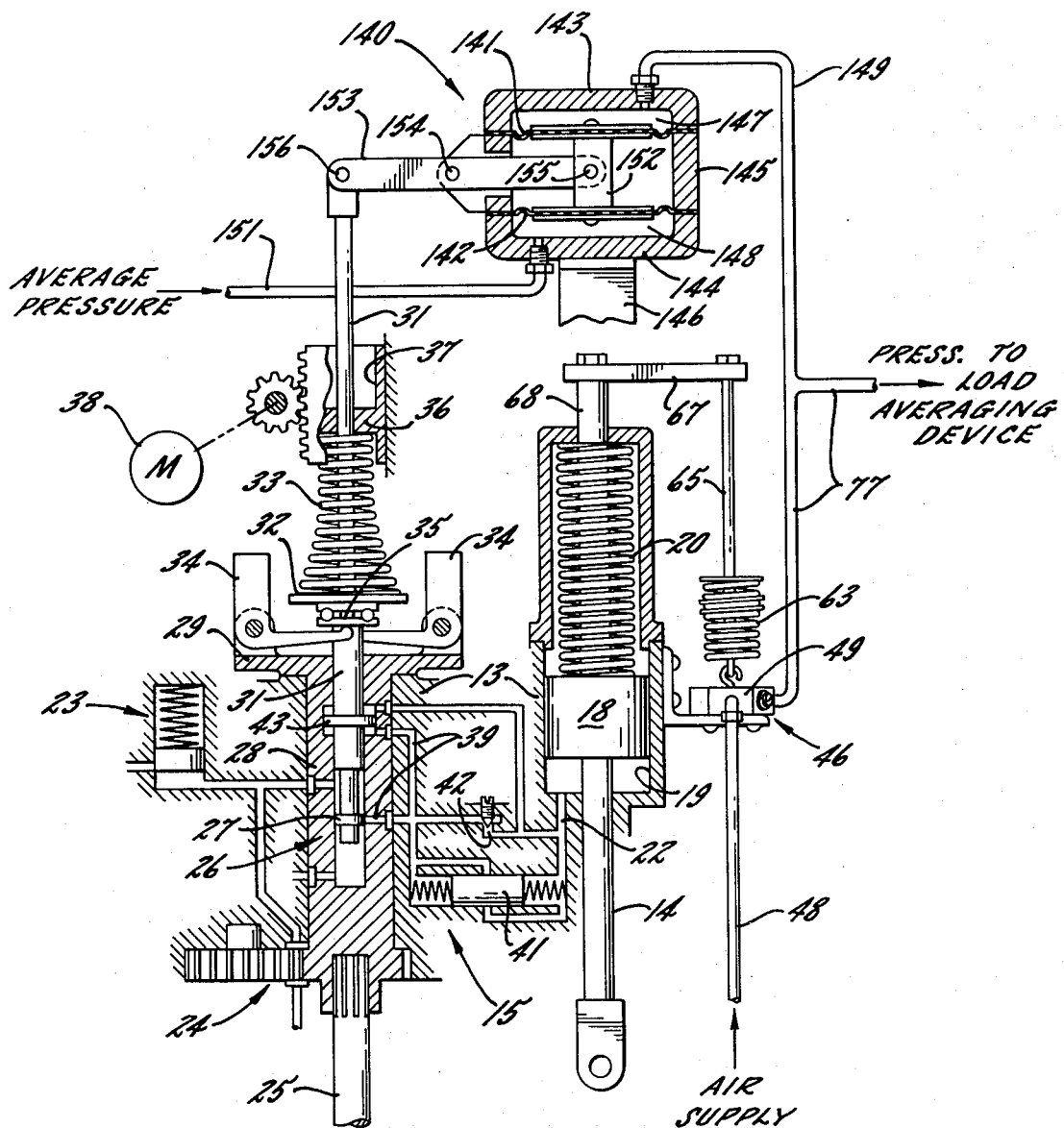
FIG. 6 is a schematic cross-section and circuit diagram of the fuel regulator, governor, and load-comparing and adjusting device of one of the prime movers.

Pressure changes in the valve-controlled space 39 are transmitted to the servo cylinder 19 through a spring loaded buffer piston 41 cooperating with a restriction 42 and the fluid passages shown to derive a pressure differential as an incident to each corrective action of the governor. As described in the aforesaid patent, these differentials are in opposite senses for speed increases and decreases and are applied to a piston 43 on the valve stem 31 in a direction to return the land 27 to the neutral position shown in FIG. 6 following each speed change. This produces a drooping characteristic and stabilizing effect which is then dissipated by gradual leakage of fluid between opposite ends of the piston and through the restriction 42. As a result, the governor senses changes in the engine speed due to load changes and regulates the fuel flow to maintain constant speed and isochronous operation of the engine.

Figures 3, 4, 5:
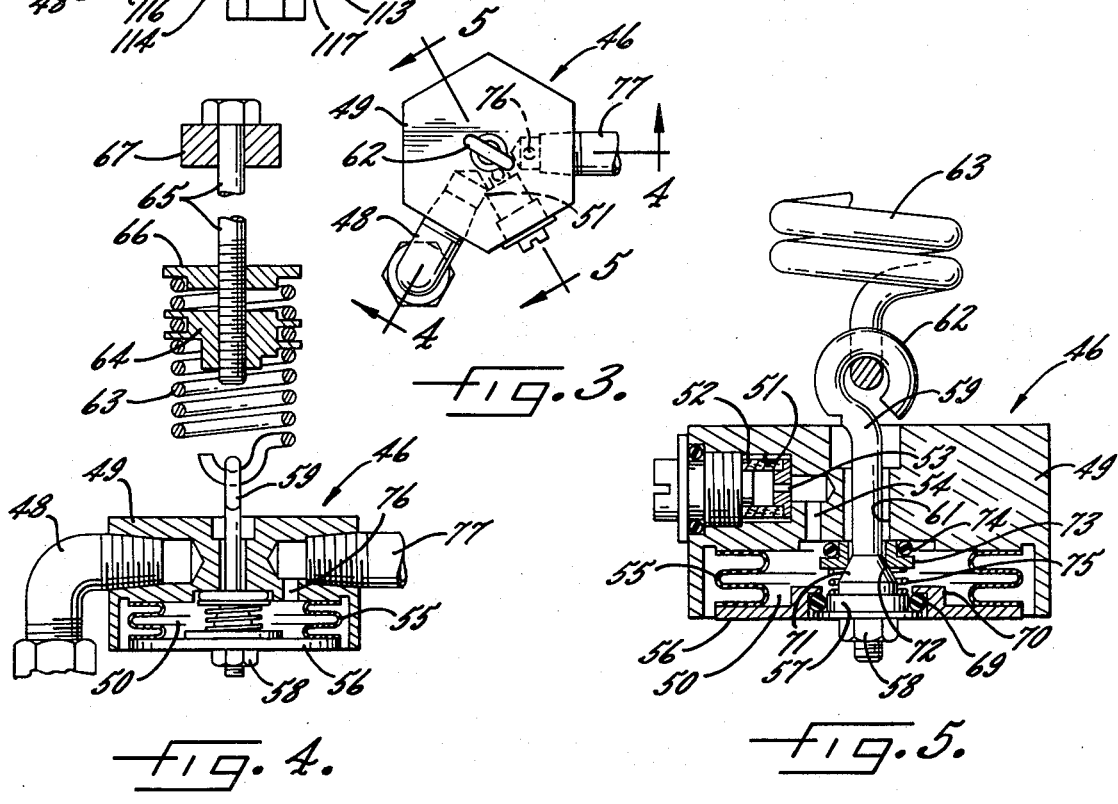
FIG. 3 is a fragmentary plan view taken along the line 3—3 of FIG. 1.
FIGS. 4 and 5 are sections taken respectively along the lines 4—4 and 5—5 of FIG. 3.

For purposes of the present invention, a position sensor and signal transmitter 46 associated with the fuel rod 14 of the governor 15 is adapted to respond automatically and continuously to changes in the fuel rod position and derive from a supply line 48 leading from a suitable source 45 of pressure fluid, compressed air in this instance at 100 psi for example, a pressure signal of a magnitude corresponding closely to such position and therefore to the prevailing rate of fuel supply to the engine 10 and the load thereon. The transmitter as shown in FIGS. 3, 4 and 5 is housed within a casing 49 secured to the side of the servo cylinder 19 and defining a chamber 50 to which air from the supply 45 is admitted through the line 48, a passage 51, a filter 52, a flow-limiting restriction 53 and a passage 54. An axially extensible bellows 55 defining the periphery of the chamber is secured at one end to the casing and at the other end to a movable wall in the form of a disc 56 centrally apertured to receive the flanged head of a valve member 57. The latter is telescoped on and abuts against a nut 58 on the rod 59 which extends through a hole 61 in the casing and is formed with an eye 62. Hooked into the latter is one end of a contractile spring 63 stretched between the eye and a nut 64 threaded onto a screw 65 carrying a nut 66 for locking the spring end to the nut. The screw head abuts an arm 67 rigid with and extending laterally from an extension 68 of the fuel rod 14. The spring tension compresses a seal ring 69 (FIG. 5) against the inner flanged edge 70 of the disk 56 and urges a frusto-conical end 71 of the valve member 57 against a seal 72 formed by the flanged end of a ring 73 abutting a seal ring 74 compressed against the casing wall by a light spring 75.

With an outlet passage 76 from the chamber 50 closed against the escape of air, the member 57 will remain seated as shown in FIG. 5 and the chamber 50 will be closed when the chamber pressure acting on the disk 56 is less than the pull exerted by the spring 63 in the increased fuel position of the servo piston 18. As the servo piston moves downwardly and the spring force decreases as a result of the governor action following a reduction in load on the engine or a decrease in the speed-setting of the governor thereof, the chamber pressure exerted on the disk 56 will be sufficient to overcome the spring force and move the valve member 71 away from the seat 72. Such opening of the valve and release of air from the chamber through the hole 61 and at a rate limited by the orifice 53 is accompanied by a decrease in the chamber pressure which continues until the total pressure on the disk 56 just balances the spring force. At this time, the escape of air to the atmosphere is the same as the rate of flow through the orifice 53 and the pressure within the chamber will remain constant. Similar adjustment of the valve occurs with each change in the position of the fuel rod 14 and, as a result, the escape of air from the chamber and through the passage is varied so as to establish within the chamber 50 and a pipe 77 leading therefrom a pressure precisely corresponding in magnitude to the prevailing position of the fuel rod.

The governors 15' and 15" of the other engines are of the same construction and similarly equipped with signal transmitters 46' and 46" of the same construction as the transmitter 46 and operating in the same manner to derive pressure signals corresponding precisely in magnitudes to the prevailing positions of the fuel rod 14' and 14" as the latter are changed from time to time by the action of the governors 15' and 15". The parts of the governors and transmitters corresponding to those above described are indicated by the same but primed and double primed reference numbers.

The transmitters 46, 46' and 46" are, by correlating various factors including the orifices, valve openings and the spring forces, adapted to produce pressure signals which correspond closely to the positions of the respective fuel rods 14, 14' and 14". Under most service conditions, it is desirable to adjust these transmitters to produce in the respective output pipes 77, 77' and 77" pressures of about 3 psi at the idle fuel position to 15 psi at the full maximum engine speed.

In accordance with the present invention, a device 80 (FIGS. 1 and 2) common to all of the prime movers operates to add the load pressure signals produced by the individual transmitters 46, 46' and 46" and derive from the sum thereof a signal, pressure in this instance, closely corresponding in magnitude to the average of these individual load signals and therefore the average of the loads on the active prime movers. In the preferred form shown in FIG. 2, the device 80 comprises a multi-part casing 81 including end plates 82, 83 and intervening rings 84 to 90 clamped together end to end by suitable tie bolts (not shown) and separated by diaphragms 91 to 98 of synthetic rubber or other suitable flexible material. The adjacent diaphragms are separated from each other by spacers 100 to 105 which are fixed to a valve stem 106 extending along the casing axis and fixed to an adjustable head 107 above the diaphragm 91 and a head 108 below the diaphragm 97.

Opposite ends of the adjacent pairs of the rings 84 to 88 are formed with inturned flanges 109 of equal diameters while outturned flanges 110 of equal sizes are formed on the adjacent ends of the spacers 101 to 105. Thus, the interior of the housing 81 between the diaphragms 91 and 97 is divided into pairs of chambers $a$ and $b$, $c$ and $d$, and $e$ and $f$ having end walls formed by the diaphragms 91, 93 95 and 97 which are equal in size but somewhat smaller in area than the end walls formed by the diaphragms 92, 94 and 96, which walls are of equal areas. It will be apparent that the diaphragms support the stem 106 free of rubbing friction so that the stem is positioned axially in accordance with the difference between the sum of the pressures in the chamber $a$, $c$ and $e$ and the sum of the opposing pressures in the chambers $b$, $d$ and $f$. The pressure signals produced by the transmitters 46, 46' and 46" of the respective prime mover 10, 10' and 10" are communicated to the chambers $a$, $c$ and $e$ through the pipes 77, 77' and 77" so that a total force equal to the sum of these pressures is, in view of the differences in the diaphragm areas, exerted on the stem 106 in the downward direction as viewed in FIG. 2. Such downward movement of the stem initially in response to the pressure build-up in the chambers $a$, $c$ and $e$ as the prime movers are started opens a valve 112 to admit pressure from the supply line 48 and a chamber connected thereto to a chamber 125 and thus establish therein a pressure which is applied to the chambers $b$, $d$ and $f$ and builds up in the latter until the sum of such pressures equals the sum of the pressures prevailing in the chambers $a$, $c$ and $e$.

The valve 112 comprises a conical head 114 on the lower end of a member 115 urged toward a seat 116 by a compression spring 117 and having on its other end a taper 118 which faces in the same direction as the taper 114 of the valve 112 and cooperates with a seat 119 at the end of a passage 121 in the head 108 which is smaller in diameter than the interior of the ring 89 and is secured to the lower end of the stem 106 in abutment with the diaphragm 97 at its upper end and with the diaphragm 98 at its lower end. The annulus 122 surrounding the head 108 and between the diaphragms 97, 98 is maintained at low pressure through passages 124 extending radially through the head 108 and ring 89 to connect the chamber 125 to the vent or drain area when the valve 123 is open. The taper 118 thus forms a second valve 123 responsive to the movements of the stem 106 for preventing or allowing the escape of pressure from the chamber 125 which is defined by the diaphragm 98 and a recess in the upper end of the lower end plate 83 of the casing 81.

The seat of the valve 112 is at the rigid lower end of a passage 126 connecting the chambers 113 and 125 in the lower end plate 83. It will be apparent that with the valve tapers 114 and 118 formed on the same stem 115, both of the valves respond to the movements of the stem 106, the downward movement of the latter being transmitted to the taper 114 through the medium of the taper 118 of the vent valve 123.

The chamber 125 constitutes the inlet and also the outlet end of a closed pressure system which includes a passage 127 communicating at one end with the chamber 124 and having branches 128, 128' and 128'', which, during operation of all of the prime movers, are continuously connected to the respective chambers $b$, $d$ and $f$ through valves 130, 130' and 130'' later to be described. As a result of such connections, the pressures in the chambers $b$, $d$ and $f$ as determined by that in the chamber 125 by the action of the valves 112 and 123 oppose the individual prime mover load pressures in the chambers $a$, $c$ and $e$.

Initial setting of the valve stem 106 to achieve the desired action of the valves is effected in this instance by adjusting the force of a compression spring 133 acting on the upper end of the valve stem 106 against the forces of the spring 117 and the supply pressure acting on the lower end of the head 114 of the valve 112. The spring 133 is disposed in a chamber 135 defined by the upper side of the diaphragm 91 and a recess in the upper end plate 82 and acts against the head 107 secured to the upper end of the stem. A head 136 on the inner end of a screw 134 threads through the end plate 82. The chamber 135 communicates continuously with another branch 137 of the closed pressure system and the chamber 125. With no pressure in the chambers $a$ to $f$, 125 and 135, the screw 134 is adjusted to position the stem 106 axially until the tapers 114 and 118 of the two valves 112 and 123 first engage their seats 116 and 119.

In operation, the device 80 acts in the following manner to establish in the closed pressure system above referred to including the chamber 125 and the passages 127, 128 and 137 communicating therewith a pressure closely corresponding in magnitude to the average of the loads on the several prime movers in operation at any one time. Initially, the pressures in the chambers $a$, $c$ and $e$ and also in the chambers $b$, $d$, $f$, 125 and 135 will be zero and both of the valves 112 and 123 will be closed. After starting the engines, the pressures developed by the transmitters 46, 46' and 46'' are communicated through the pipes 77, 77' and 77'' to the chambers $a$, $c$ and $e$. These forces are in the same direction and added so that the resultant is exerted unopposed on the diaphragms 92, 94 and 96 in the same downward direction. As a result, the stem 106 is moved downwardly which motion is transmitted by the head 108 to the stem 115. The latter is thus lowered to open the valve 112 and admit pressure from the supply line 48 to the chamber 125 and therefore through the passages 127, 128 and 137 to the chambers $b$, $d$, $f$ and 135. These pressures act on the diaphragms 92, 94 and 96 in opposition to the individual load pressures on the diaphragms and build up until their sum balances the sum of the load pressures thus closing the valve 112. The single pressure thus established in the closed pressure system including the chamber 125 is an accurate measure of the average of several individual load pressures transmitted to the chambers $a$, $c$ and $e$.

If, at any time, the load on any one or more of the engines decreases, the total downward force on the valve stem 106 will decrease in accordance with the load sum then prevailing. As a consequence, the average load pressures on the diaphragms 92, 94 and 96 will decrease causing the stem and the valve head 108 to be raised so as to open the valve 123. This allows fluid to escape from the chamber 125 through the vent passage 124 until the sum of the average pressures in the chambers $b$, $d$ and $f$ is again equal the sum of the load pressures in the chambers $a$, $c$ and $e$. The valve 123 is thus reclosed by the resulting downward movement of the stem 106 and head 122.

Similar action but by the pressure admission valve 112 takes place when the sum of the loads on the active prime movers and therefore the pressures from the transmitters 46, 46' and 46'' exceeds the sum of the average load pressures in the chambers $b$, $d$ and $f$. In this event, the valve rod 106 is moved downwardly an amount corresponding to the measured pressure difference. This motion is transmitted through the valve head 108 and the taper of the then closed valve 123 to the stem 115. The valve 112 is thus opened to admit pressure fluid from the supply line 48 and chamber 113 to the chamber 125 thus increasing the pressure in the latter and the branches leading to the chambers $b$, $d$ and $f$. This flow continues until the sum of the pressures in the latter chambers has been increased so as to equal the sum of the prevailing load pressures.

By the action above described, the valves 112 and 123 are actuated selectively and automatically in accordance with the prevailing difference between the sum of the pressures in the chambers $b$, $d$ and $f$ and the sum of the load pressures so as to maintain at all times in the chamber 125 and the passages communicating therewith a single pressure closely corresponding in magnitude to the sum of the prevailing loads on the then active prime movers.

To enable the average load pressure signal to be utilized in adjusting the fuel supplies to the individual engines and equalizing the loading thereof, the signal is transmitted to devices 140, 140' and 140'' associated with the respective engines and adapted to compare such pressure signal with the respective individual load pressures and transmit the measured pressure difference for each engine to a fuel adjuster for that engine. While the load comparing devices may take many different forms involving electrical or fluid pressure components, they operate mechanically in the present instance. In the form herein shown for purposes of illustration, the device for the engine 10 (See FIG. 6) includes axially flexible diaphragms 141 and 142 clamped around their peripheries between end cups 143 and 144 and the ends of a ring 145 rigidly mounted on a suitable bracket 146 on the governor casing. The chambers 147 and 148 thus defined by the cups and the diaphragms are connected respectively by pipes 149 and 151 with the outlet 77 from the transmitter 46 and a branch of the passage 127 leading from the chamber 125 of the average pressure sensor 80.

The centers of the diaphragms are clamped between pairs of disks which are spanned and joined rigidly by a bar 152 which is thus moved back and forth with changes in the average and individual load pressures and is disposed in a centered position when these pressures are equal. When the pressures differ due to a deviation between the average load signal and the individual load signal, the bar is moved in the direction and by an amount corresponding to the difference. This force difference is, in the present instance, transmitted directly to the stem 31 of the governor valve 26 to vary the position thereof and effect a corresponding change in the position of the throttle rod 14 and therefore the loading of the engine 10.

Herein, the load adjuster, which acts through the valve regulating the speed governor of the engine 10, takes the simple form of a lever 153 swingable about a fixed fulcrum 154 intermediate its ends and pivotally connected at opposite ends 155 and 156 with the bar 152 and the governor valve stem 31. With this arrangement, it will be apparent that when the load on the engine 10 is greater than the measured average load, the pressure in the chamber 147 of the device 140 will be greater than the average load pressure in the chamber 148 thus exerting on the valve stem 31 a force which raises the latter correspondingly. The valve land 27 is raised above the port 39 thus allowing fluid to escape from the cylinder 19 and the fuel rod 14 to be lowered until the fuel supply to the engine 10 and therefore the loading of the latter corresponds to the average load as measured by the device 80.

Conversely, if the load on the engine 10 is or becomes less than the measured average load, the load adjusting lever 153 will be rocked counter-clockwise and thus lower the valve land 27 an amount corresponding to the pressure difference detected by the device 140. Pressure fluid is thus admitted to the servo cylinder 19 until the fuel supply and therefore the load carried by the engine 10 has been increased to match the average load as measured by the device 80.

The pressure comparing devices 140' and 140'' associated with the governors 15' and 15'' of the engines 10' and 10'' are of the same construction and operate in the manner above described to actuate the load adjusting levers 153' and 153'' and match the loads on the engines 10' and 10'' with the average load as measured by the device 80. The pressure areas and the parts of the transmitters 46, 46' and 46'', the devices 140, 140' and 140'' and the load adjusters 31, 31' and 31'' are correlated in construction so that the positions of the engine throttles 14, 14' and 14'' are closely matched at all times and the loads on the active engines effectually equalized.

In another of its aspects, the invention provides for selectively interrupting the operation of any one or more of a group of engines without effecting the operation of the device 80 in measuring the average loading of the engines remaining active and maintaining equal loads on such engines. For this purpose, each of the valves 130, 130' and 130'' above referred to is adapted to be shifted individually from the positions shown in FIG. 2 to that shown in FIG. 2a to interrupt the connection between any one of the chambers a, c and e and the corresponding transmitter 46, 46' and 46'' and connect such chamber to the corresponding average pressure branch passage 128, 128' or 128'' and thus equalize the pressures on opposite sides of the diaphragm 92, 94 to 96 forming the movable wall of the disconnected chamber.

Figure 2A:
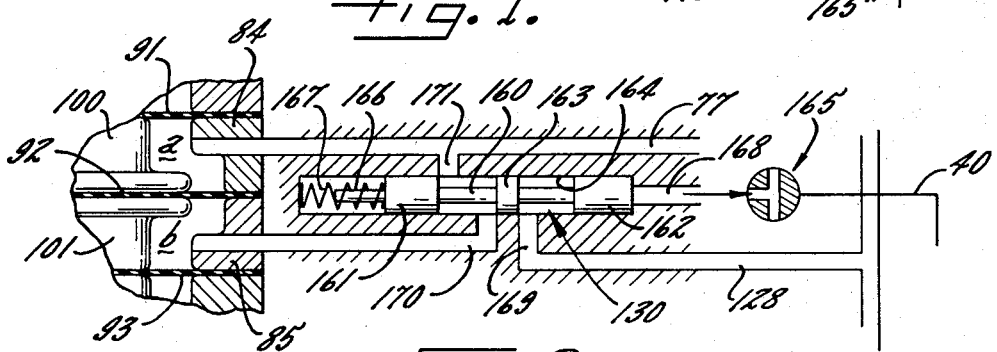
FIG. 2a is a fragmentary view of part of FIG. 2 showing the inlet valve.
Figure 2:
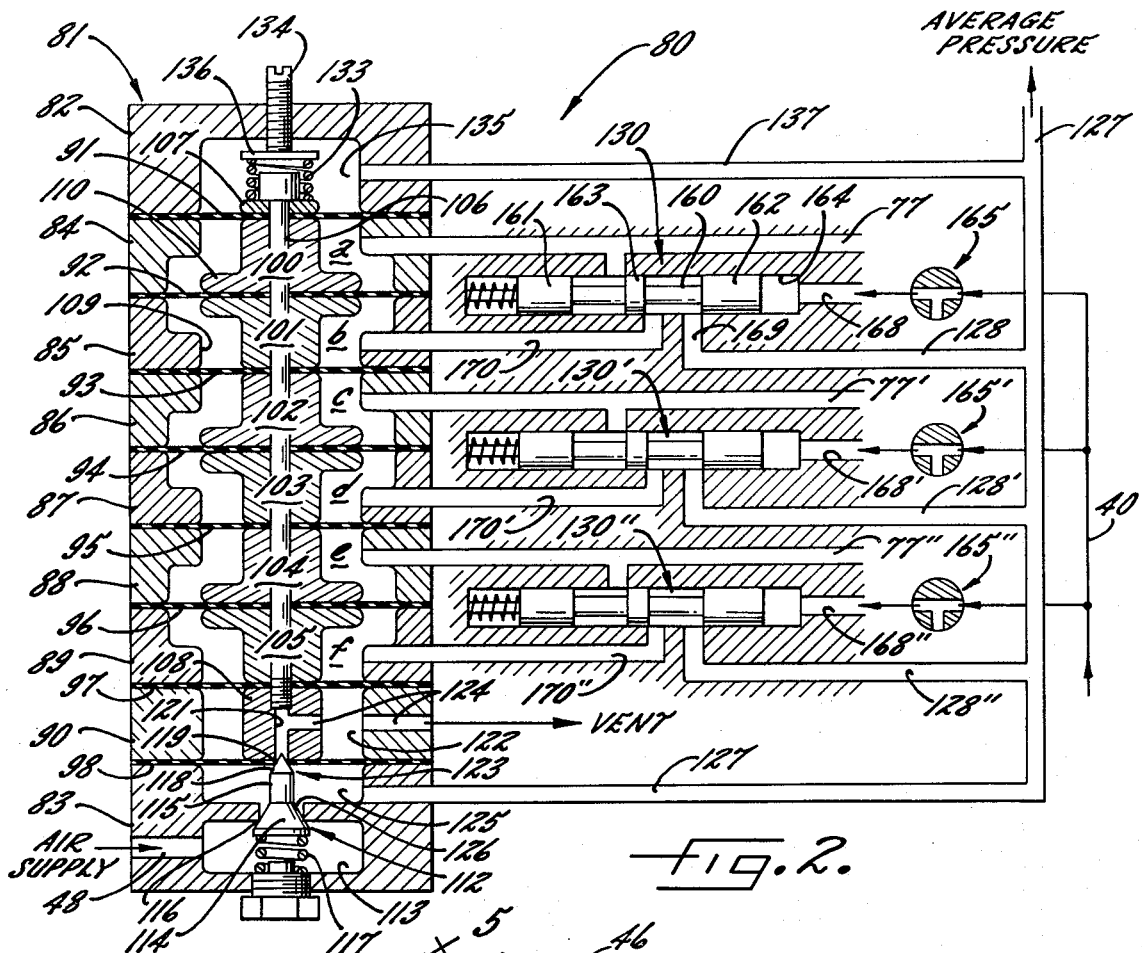
FIG. 2 is a cross-section of the load averaging device shown in FIG. 1 including the associated fluid passages.

Preferably, each valve 130, 130' and 130'' comprises a plunger 160 having spaced end lands 161 and 162 and a central land 163 slidable in a cylinder 164 and normally urged to the position shown in FIG. 2 by pressure from the supply line 40 admitted through a two-way valve 165 and a passage 168 to the cylinder at the end of the land 162. The valve plunger 160 is thus urged to the limit position shown determined by engagement of an extension 166 with the opposite end of the cylinder. In this position, the average pressure line 128 is connected, as shown in FIG. 2, to the chamber b through the cylinder 164 and between the lands 162 and 163, which are then disposed on opposite sides of passages 169 and 170 communicating with the line 128. A similar passage 171 communicating with the pipe 77 is then disposed between the lands 161 and 163. When the valve 165 is shifted to the position shown in FIG. 2a, the pressure against the land 162 is released permitting a compression spring 167 acting against the land 161 to move the plunger to the opposite end of the valve cylinder. The valves 130' and 131'' are similarly constructed and controlled by valves 165' and 165'' each shiftable by swinging a hand lever 173 between pressure-admitting and releasing positions shown in FIGS. 2 and 2a.

Considering operation of the valve 130, the passages 77 and 128 will be disconnected when pressure fluid is admitted through the valve 165, these passages being then connected to the chambers a and b. When the pressure is released by shifting the valve 165, as shown in FIG. 2a, the plunger 160 will be moved by its spring 167 to the opposite end of the cylinder. Then, the passage 169 will be blocked and the chambers a and b and the passages 77 and 170 will be connected. This permits the free flow of fluid back and forth between the two chambers so as not to interfere with the positioning of the valve stem 106 of the averaging device by the transmitters of the engines remaining active.

It will be apparent from the foregoing that the device 80 constructed and operating as above described in conjunction with the signal transmitters 46, 46' and 46'' enables the loads on any number of prime movers driving a common load to be equalized and maintained equal automatically and this, without the necessity of selecting any one of the prime movers as a master reference. At the same time, any one or more prime movers of the group may be cut out of operation and then returned to active control without affecting the action of the device 80 in determining the average load pressure signal and regulating the loads on the active units. This is accomplished simply through the adjustment of the valves 165 as above described.

In addition, the device 80 may, by a simple addition, be adapted for use with a larger number of prime movers than the three selected here for illustration. For this purpose, a diaphragm like 92 and corresponding pairs or rings like 84, 85 would be incorporated in the stack of rings shown and valves like 130 and 165 would be associated with the added rings and diaphragm. The average load pressure and the individual load pressure for each unit would be transmitted to the added chambers like $a$ and $b$ through passages such as 77 and 128 above described.

I claim:

1. Apparatus for determining the average of the loads on first and second prime movers driving a common load and each having a regulator individually adjustable to vary the energy supply to its prime mover, said apparatus comprising a housing closed at opposite ends, a stem disposed within said housing and movable axially back and forth in opposite directions relative to a center position, a plurality of axially flexible diaphragms of equal areas secured at their centers to said stem and axially spaced along the stem to divide the interior of said housing into chambers $a$ and $b$ on opposite sides of one of the diaphragms and chambers $c$ and $d$ on opposite sides of the other diaphragm, said chambers $a$ and $d$ being at opposite ends of the group, means providing a source of pressure fluid and a drain area extending into and out of said housing at one end thereof, a closed pressure system communicating with said chambers $b$ and $d$, valve means actuated by said stem and operable to connect said system to said pressure source when said stem is moved off-center by the sum of the pressures in the chambers $a$ and $c$ exceeding the sum of the pressures in the chambers $b$ and $d$, said valve means connecting said chambers $b$ and $d$ to said drain area when said stem is disposed off-center in the opposite direction, a plurality of transmitters, one for each of said engines, deriving from said pressure source pressure signals corresponding in magnitude to the prevailing positions on the respective regulators and transmitting such pressures to the respective chambers $a$ and $c$ whereby to actuate said valve means in accordance with the difference between the sum of the $a$ and $c$ pressures and the sum of the opposing $b$ and $d$ pressures thereby establishing in said system a pressure which is the average of the loads on the respective engines.

2. Apparatus as defined in claim 1 in which the outer end walls of said chambers $a$ and $d$ and adjacent walls of said chambers $b$ and $c$ are defined by diaphragms substantially smaller in area than said first diaphragms and secured at their centers to said valve stem whereby to support said stem free of rubbing friction.

3. Apparatus as defined in claim 1 including valve means selectively operable to interrupt the transmission of said individual load pressure signals to said chambers $a$ or $c$ and connect such chamber to the associated average load pressure chamber $b$ or $d$.

4. Apparatus as defined in claim 2 in which said end walls are of substantially equal areas and define the inner walls of end chambers communicating with said average pressure system so as to provide equal and oppositely acting pressure forces on said stem.

5. Apparatus as defined in claim 4 including resilient means selectively adjustable to vary the loading on said valve stem and locate the stem in said center position when the pressures in all of said chambers are equal.

6. Apparatus as defined in claim 1 in which said valve means comprises a second stem cooperating with a seat rigid with said first stem and forming one valve controlling the escape of pressure fluid from said closed pressure system, said second stem cooperating with a seat rigid with said casing to form a normally closed second valve actuated by said first stem and regulating the flow of pressure fluid from said source into said system while the first valve is closed.

7. Apparatus as defined in claim 6 in which first valve comprises a taper on the inner end of said second stem cooperating with the end of a passage on said first stem leading to a drain area and said second valve comprises a taper on the outer end of said second stem cooperating with a port in said casing between said pressure source and said closed system.

8. Apparatus for automatically maintaining equal loads on a plurality of prime movers driving a common load and each having a regulator selectively adjustable to vary the supply of energy medium to the associated prime mover, said apparatus including transmitters associated with the respective regulators to derive from a fluid pressure source signals changing with the positions of the respective regulators and at all times corresponding in magnitude with the loads being carried by the respective prime movers, a closed fluid pressure system, valve means controlling the flow from said pressure system into or out of the system, a device subject to said individual load pressures and operating to add the same and actuate said valve means to establish in said system a pressure which corresponds closely in magnitude to the average of said load signals, a plurality of devices each associated with one of said prime movers and responsive to said average load pressure and the load pressure produced by the associated transmitter to determine the deviation of the prevailing individual load pressure from said average pressure, and means for adjusting the supplies of energy medium to the respective prime movers in accordance with the signs and magnitudes of the pressure deviations measured by said devices whereby to locate said regulators in corresponding positions and thereby equalize the loads on all of said prime movers.

9. Apparatus as defined in claim 8 in which a speed governor is associated with each prime mover having a speed sensor and a valve actuated thereby to control the supply of energy medium to the prime mover and maintain operation at the selected speed setting of the governor, and in which the differential between the individual and average load pressures measured by each of said comparing devices is exerted on the control valve of the associated speed governor to adjust the prime mover loading.

10. The method of equalizing the loads carried by a plurality of internal combustion engines driving a common load and each having a regulator selectively adjustable to determine the engine fuel supply, said method comprising the steps of, deriving from the movements of the respective regulators signal forces corresponding in magnitude to the fuel supplies and therefore the loads on the associated engines, adding said forces and deriving from the sum thereof a single opposing force which is the average of said first forces, separately balancing each of said first forces against said average force to thereby determine the deviation in the load on each engine from said average load, and adjusting the regulator of each governor in a direction and by an amount equal to the measured deviation of its engine load from said average load so as to equalize the loads on all of said engines with said average load.

* * * * *

UNITED STATES PATENT OFFICE
CERTIFICATE OF CORRECTION

Patent No. 3,772,884                          Dated November 20, 1973

Inventor(s)        Ronald L. Witt

It is certified that error appears in the above-identified patent and that said Letters Patent are hereby corrected as shown below:

Column 4, line 43, "88" should read ---89---.

Column 5, line 1, ---113--- should be inserted after "chamber"; line 13, "89" should read ---90---; line 19, "89" should read ---90---; line 38, "124" should read ---125---.

Column 6, line 39, "122" should read ---108---.

Column 8, lines 17 and 18, "the corresponding average pressure branch" should be deleted; line 18, "128, 128' or 128''" should read ---170, 170' or 170''---; line 20, "to" should read ---or---.

Column 10, line 29, "signals" should read ---signal pressures---; line 34, "system" should read ---source---; line 38, ---individual--- should be inserted after "said"; same line, "signals" should read ---pressures---.

Signed and sealed this 9th day of July 1974.

(SEAL)
Attest:

McCOY M. GIBSON, JR.
Attesting Officer

C. MARSHALL DANN
Commissioner of Patents